(12) United States Patent
Vinogradov et al.

(10) Patent No.: US 12,393,000 B2
(45) Date of Patent: Aug. 19, 2025

(54) OPTICAL ARRANGEMENT FOR SMALL SIZE WIDE ANGLE AUTO FOCUS IMAGING LENS FOR HIGH RESOLUTION SENSORS

(71) Applicant: ZEBRA TECHNOLOGIES CORPORATION, Lincolnshire, IL (US)

(72) Inventors: Igor Vinogradov, Oakdale, NY (US); Alexander J. Naney, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 577 days.

(21) Appl. No.: 16/800,866

(22) Filed: Feb. 25, 2020

(65) Prior Publication Data

US 2021/0263290 A1    Aug. 26, 2021

(51) Int. Cl.
*G02B 13/18* (2006.01)
*G02B 3/12* (2006.01)
*G02B 3/14* (2006.01)
*G02B 13/00* (2006.01)

(52) U.S. Cl.
CPC ............. *G02B 13/009* (2013.01); *G02B 3/12* (2013.01); *G02B 3/14* (2013.01); *G02B 13/18* (2013.01)

(58) Field of Classification Search
CPC .......... G02B 13/18; G02B 3/12; G02B 5/005; G02B 13/24; G02B 13/0045; G02B 13/0055; G02B 13/002; G02B 9/12; G02B 9/24; G02B 15/14; G02B 15/143; G02B 15/22; G02B 27/0025; G02B 27/0006; G02B 13/0035; G02B 3/14; G02B 26/004; G02B 1/041; G02B 13/06; G02B 13/009;
(Continued)

(56) References Cited

U.S. PATENT DOCUMENTS 4,407,567 A * 10/1983 Michelet .................. G02B 3/14
359/666
4,685,774 A * 8/1987 Moskovich .......... G02B 13/004
359/650
(Continued)

FOREIGN PATENT DOCUMENTS

CN          200953053 Y       9/2007
DE       102006049425 A1      5/2007
(Continued)

OTHER PUBLICATIONS

Lohmann, Adolf W. "Scaling Laws for Lens Systems." Applied Optics, vol. 28, No. 23, Dec. 1, 1989, pp. 4996-4998. (Year: 1989).*
(Continued)

*Primary Examiner* — Zachary W Wilkes

(57) ABSTRACT

A method and apparatus for capturing an image of at least one object appearing in a field of view (FOV). A housing has an image sensor an autofocusing lens assembly fixedly mounted relative thereto. The autofocusing lens assembly employs multiple lens groups and a liquid lens. The lens groups, liquid lens, and the image sensor are aligned such that light received within the FOV passes through the lens groups and liquid lens and impinges onto the image sensor. The image sensor generates an electrical signal indicative of the received image.

15 Claims, 3 Drawing Sheets

(58) Field of Classification Search
CPC . G02B 13/04; G02B 9/64; G02B 7/02; G02B 7/021
USPC ....... 359/651, 655, 665–667, 676, 677, 683, 359/694–706, 716, 737, 740, 756, 759, 359/784, 798–803, 808–830
See application file for complete search history.

(56) References Cited

U.S. PATENT DOCUMENTS

| | | | | |
|---|---|---|---|---|
| 4,784,479 | A * | 11/1988 | Ikemori | G02B 3/14 359/666 |
| 5,315,435 | A * | 5/1994 | Horiuchi | G02B 5/06 359/557 |
| 5,677,792 | A * | 10/1997 | Hamano | G02B 27/646 359/557 |
| 5,771,123 | A * | 6/1998 | Hamano | G02B 15/144113 359/557 |
| 6,459,535 | B1 * | 10/2002 | Goto | G02B 3/14 359/689 |
| 6,936,809 | B2 * | 8/2005 | Viinikanoja | G02B 27/646 359/666 |
| 7,317,580 | B2 * | 1/2008 | Kogo | G02B 3/14 359/716 |
| 7,342,726 | B2 * | 3/2008 | Kim | G02B 3/14 359/666 |
| 7,573,646 | B2 * | 8/2009 | Craen | G02B 7/021 359/666 |
| 8,355,210 | B2 * | 1/2013 | Wang | G02B 26/005 359/689 |
| 8,373,932 | B2 * | 2/2013 | Wang | G02B 13/18 359/716 |
| 8,472,122 | B2 * | 6/2013 | Obu | G02B 3/14 359/683 |
| 8,520,313 | B2 * | 8/2013 | Wada | G02B 3/14 359/676 |
| 8,520,314 | B2 * | 8/2013 | Yamamoto | G02B 13/009 359/666 |
| 8,687,281 | B2 * | 4/2014 | Jannard | G02B 26/004 359/557 |
| 9,201,175 | B2 * | 12/2015 | Jannard | G02B 15/00 |
| 9,268,110 | B2 * | 2/2016 | Bueler | G02B 27/0025 |
| 9,581,736 | B2 * | 2/2017 | Jannard | G02B 3/14 |
| 9,658,436 | B2 * | 5/2017 | Jannard | G02B 13/009 |
| 10,191,261 | B2 * | 1/2019 | McCafferty | G02B 15/22 |
| 10,795,060 | B2 * | 10/2020 | Nunnink | G06K 7/10831 |
| 11,385,385 | B2 * | 7/2022 | Nunnink | G06K 7/14 |
| 11,435,565 | B2 * | 9/2022 | Shiokawa | H04N 9/3141 |
| 11,456,503 | B2 * | 9/2022 | Shivaraju | H01M 10/425 |
| 2001/0017985 | A1 * | 8/2001 | Tsuboi | G02B 26/02 396/506 |
| 2005/0200973 | A1 * | 9/2005 | Kogo | G02B 26/004 359/689 |
| 2006/0056042 | A1 | 3/2006 | Kim et al. | |
| 2007/0097515 | A1 * | 5/2007 | Jung | G02B 13/006 359/666 |
| 2007/0195424 | A1 | 8/2007 | Ojala | |
| 2009/0091844 | A1 | 4/2009 | Jannard et al. | |
| 2009/0185281 | A1 * | 7/2009 | Hendriks | G02B 26/005 359/666 |
| 2010/0259833 | A1 * | 10/2010 | Jannard | G02B 15/00 359/666 |
| 2013/0201384 | A1 * | 8/2013 | Tsuji | G02B 26/004 359/666 |
| 2014/0192427 | A1 | 7/2014 | Bueler et al. | |
| 2015/0316748 | A1 * | 11/2015 | Cheo | G02B 7/005 359/694 |
| 2016/0202455 | A1 * | 7/2016 | Aschwanden | G02B 13/0075 359/666 |
| 2020/0301116 | A1 * | 9/2020 | Aschwanden | G02B 3/14 |
| 2021/0116682 | A1 * | 4/2021 | Smolka | G02B 13/12 |
| 2021/0373274 | A1 * | 12/2021 | Naney | G02B 7/09 |

FOREIGN PATENT DOCUMENTS

| | | | | |
|---|---|---|---|---|
| JP | 5550479 B2 * | 7/2014 | | G02B 13/009 |
| TW | 201100861 A | 1/2011 | | |
| WO | 2004038480 A1 | 5/2004 | | |

OTHER PUBLICATIONS

Combined Search Report and Written Opinion for Great Britain Patent Application No. GB 2102548.1 mailed on Oct. 4, 2021.
Office Action for German Application No. 2102548.1 mailed on Aug. 28, 2023.

* cited by examiner

OPTICAL ARRANGEMENT FOR SMALL SIZE WIDE ANGLE AUTO FOCUS IMAGING LENS FOR HIGH RESOLUTION SENSORS

BACKGROUND OF THE INVENTION

Imaging devices generally capture images within a given field of view (FOV). It is often required that that scanning devices capture images with a wide-angle field of view to effectively decode information in an image for use in machine vision applications. Additionally, the demand for portable sensors is increasing which requires the use of smaller sensors further requiring active alignment of the sensors necessitating an air gap between optics and the sensor. Accordingly, portable scanning devices must be capable of functioning with a wide field of view while generating sharp images over a working range for the purposes of machine vision.

Auto focus with mechanical movement of lenses is widely used in machine vision systems. Typically, the lenses are moved using motors to adjust the focus, which increases the size of the system, and makes the system prone to mechanical failures. Additionally, typical lenses for high resolution imaging cameras contain multiple lens elements which increases the cost of the lenses. While some systems may address these, and other issues, via a combination of complicated custom optics and electromechanical components, such systems are fairly complex and costly, and can adversely impact reliability of the device.

Accordingly, there is a need for improved systems, methods, and devices which address these issues.

SUMMARY

In an embodiment, the present invention is an optical assembly for wide angle auto-focused imaging of an object of interest. The optical assembly comprises a first lens group disposed along an optical axis configured to receive light from the object of interest and configured to correct for spherical aberrations of an image projected by a third lens group onto an imaging sensor; a liquid lens disposed along the optical axis configured to receive the light from the first lens group and further configured to variably focus an image at distances from 76.2 millimeters to infinity; a second lens group disposed along the optical axis configured to receive the light from the liquid lens and further configured to correct for optical aberrations, and to magnify an image projected by the third lens group onto the imaging sensor; the third lens group disposed along the optical axis configured to receive the light from the second lens group and further configured to correct for optical field curvature and distortion of the image projected by the third lens group onto the imaging sensor; and the imaging sensor being disposed along the optical axis at a back focal distance of the third lens group, and configured to receive the image from the third lens group and to generate an electrical signal indicative of the received image.

In a variation of the current embodiment, the imaging sensor is a solid-state imager. In another variation of the current embodiment, the liquid lens has a variable optical power from −5 to 15 diopters.

In a variation of the current embodiment, the first lens group comprises a first plastic aspheric lens and wherein the plastic aspheric lens of the first lens group has a first aspheric surface along the optical axis and a second aspheric surface opposite the first aspheric surface disposed along the optical axis, and wherein the first plastic aspheric lens is formed of a Crown type plastic having a positive optical power.

In a variation of the current embodiment, the second lens group comprises a first plastic aspheric lens, a second plastic aspheric lens, and a third glass lens, wherein the first plastic aspheric lens of the second lens group has a first aspheric surface along the optical axis and a second aspheric surface opposite the first aspheric surface disposed along the optical axis, and wherein the first plastic aspheric lens is formed of a Crown type plastic having a positive optical power, the second plastic substantially aspheric lens of the second lens group has a first aspheric surface along the optical axis and a second aspheric surface along the optical axis, and wherein the second plastic aspheric lens is formed of a Flint type material having a negative optical power, and the third glass lens has a first substantially flat surface along the optical axis and a second spherical surface disposed along the optical axis, and the third glass lens is formed of a Crown type glass having a positive optical power.

In a variation of the current embodiment, the third lens group has a first plastic aspheric lens, and a second plastic aspheric lens, wherein the first plastic aspheric lens of the third lens group has a first aspheric surface along the optical axis and a second aspheric surface opposite the first aspheric surface disposed along the optical axis, and wherein the first plastic aspheric lens is formed of a Flint type plastic having a positive optical power, and the second plastic aspheric lens of the first lens group has a first aspheric surface along the optical axis and a second aspheric surface along the optical axis, and wherein the second plastic aspheric lens is formed of a Flint type material having a negative optical power.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
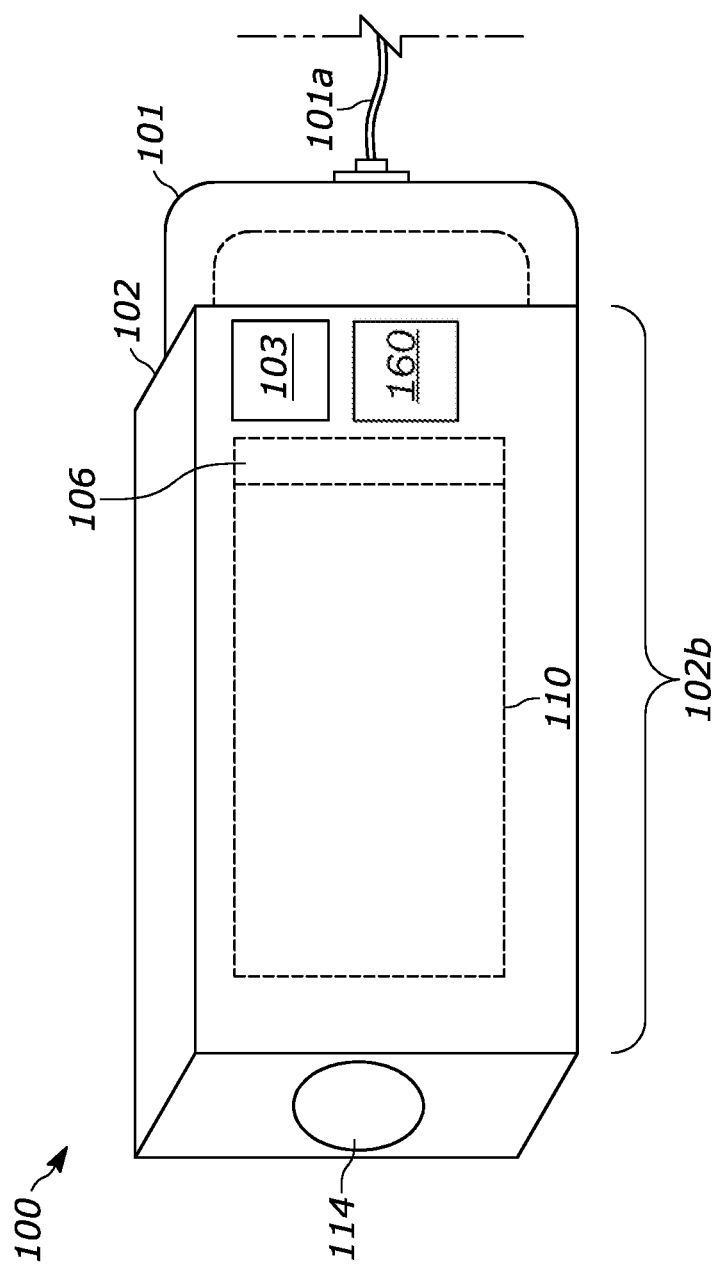
FIG. 1 is a schematic side elevation view of a machine vision device having an imaging system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Portable high-performance optical imaging systems for machine vision employ small imaging sensors to maintain small form factors. For example, a typical machine vision imaging sensor has an imaging sensor rectangular area of around 3 by 3 millimeters with sensor pixels areas of approximately 3 microns. Some high-performance compact machine vision systems require wide angle fields of view (FOVs) (e.g., greater than 40 degrees) in addition to small form factor imaging sensors. Additionally, autofocusing is commonly required for achieving the resolutions required for processing of images required for machine vision processes. The current disclosure describes a wide field of view optical assembly with that employs three lens groups and a liquid lens that improves upon current technologies by: (i) improving the correction of optical aberrations of images, (ii) reduces the size and cost of autofocusing imaging systems for machine vision, and (iii) provides a back wide range of focal distances for the imaging system.

In an exemplary implementation, the present application provides an optical assembly capturing a wide-angle image of at least one object appearing in a field of view (FOV). In various embodiments of the present disclosure, the optical assembly includes a first, second, and third lens group and a liquid lens disposed along the optical axis. The first lens group is disposed along the optical axis configured to receive the light from the object of and is configured to correct for spherical aberrations of an image projected by the third lens group. The liquid lens is disposed along the optical axis and the liquid lens is configured to receive the light from the first lens group and further configured to magnify an image along mutually orthogonal directions generally perpendicular to the optical axis. An aperture stop is disposed along the optical axis between the liquid lens and the second lens group. The second lens group is disposed along the optical axis and the second lens group is configured to receive the light from the liquid lens and further configured to correct for optical field distortions of an image projected by the third lens group. The third lens group is disposed along the optical axis between the second lens group and an imaging sensor and is configured to correct for optical field curvature and distortion of the image projected by the third lens group. The imaging sensor is disposed along the optical axis approximately at a flange focal length of the third lens group, and the imaging sensor is configured to receive the image from the third lens group and to generate an electrical signal indicative of the received image.

Figure 2:
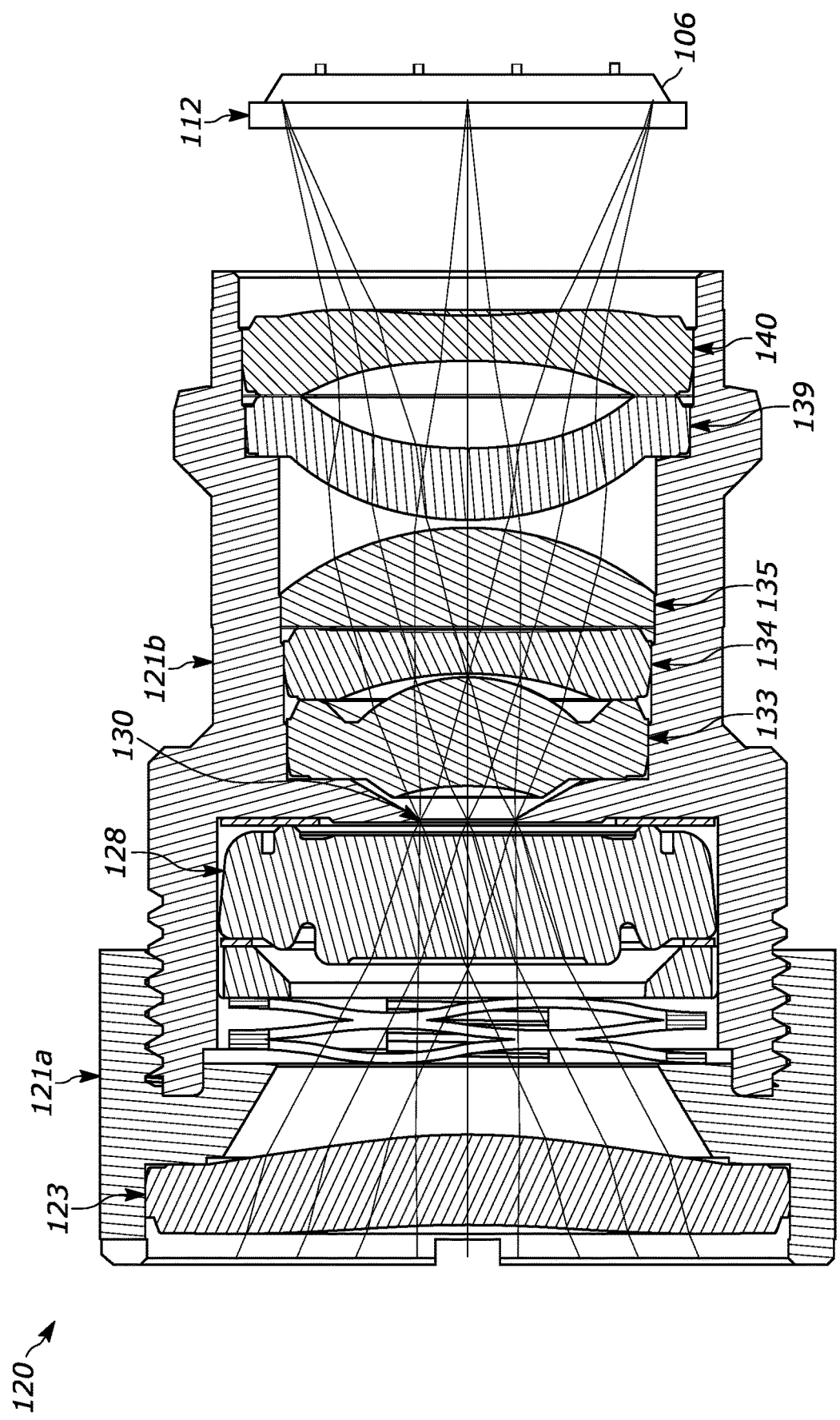
FIG. 2 is a cross-sectional side view of the machine vision device of FIG. 1 in accordance with some embodiments.
Figure 3:
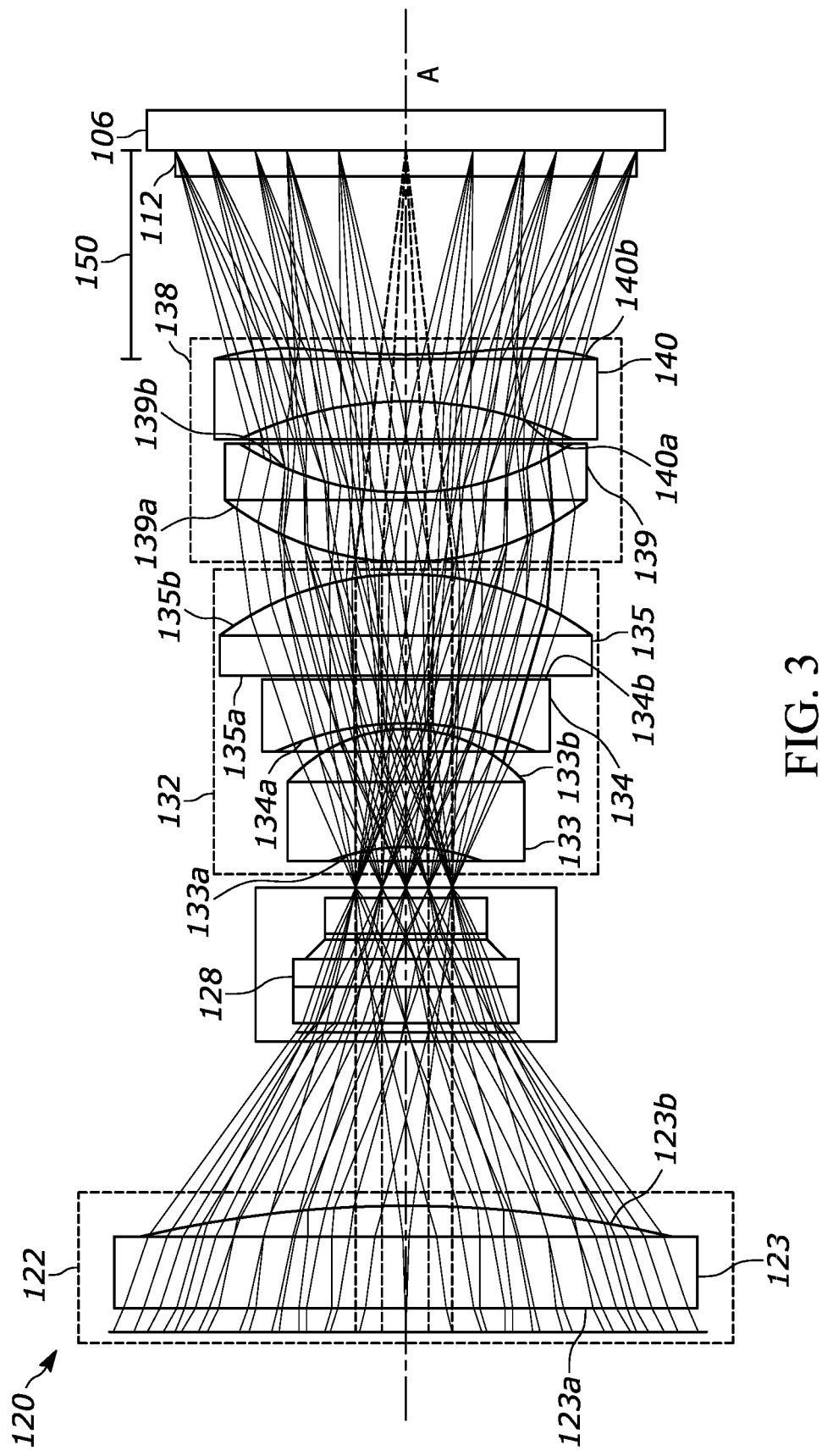
FIG. 3 is a cross-sectional side view of an optical assembly of the machine vision device of FIGS. 1 and 2 in accordance with some embodiments.

A first embodiment of an imaging-based machine vision device is shown schematically in FIGS. 1-3. The machine vision device 100 includes a housing 102, an imaging system 110 at least partially disposed within the housing 102 that includes an imaging camera assembly. Specifically, the imaging system 110 includes an image sensor 112, and a lens assembly 120. The device 100 may be adapted to be inserted into a docking station 101 which, in some examples, may include an AC power source 101a to provide power for the device 100. The device 100 may further include an onboard power supply 103 such as a battery, and a printed circuit board 106 which may accommodate a memory and a controller that controls operation of the imaging system 110. In embodiments, the device 100 may include a trigger (not shown in the illustration) that is used to activate the imaging system 110 to capture an image. The device 100 may include any number of additional components such as decoding systems, processors, and/or circuitry coupled to the circuit board 106 to assist in operation of the device 100.

The housing 102 includes a forward or reading head portion 102b which supports the imaging system 110 within an interior region of the housing 102. The imaging system 110 may, but does not have to be, modular as it may be removed or inserted as a unit into the devices, allowing the ready substitution of imaging systems 110 having different imaging characteristics (e.g., camera assemblies having different focal distances, working ranges, and FOVs) for use in different devices and systems. In some examples, the field of view may be static.

The image sensor 112 may have a plurality of photosensitive elements forming a substantially flat surface and may be fixedly mounted relative to the housing 102 using any number of components and/or approaches. The image sensor 112 further has a defined central imaging axis A that is normal to the substantially flat surface. In some embodiments, the imaging axis A is coaxial with a central axis of the lens assembly 120. The lens assembly 120 may also be fixedly mounted relative to the housing 102 using any number of components and/or approaches. In the illustrated embodiment, the lens assembly 120 is positioned between a front aperture 114 and the image sensor 112. The front aperture 114 blocks light from objects outside of the field of view which reduces imaging problems due to stray light from objects other than the target object. Additionally, the front aperture 114 in conjunction with a plurality of lenses (i.e., described further herein in reference to lenses of a first lens group, a glass lens, and lenses of a second lens group) allows for the image to form correctly on the imaging sensor 112. In embodiments the housing 102 may include additional elements such as an illumination system 160 configured to illuminate a target object for imaging. The illumination system 160 may include a light emitting diode, laser diode, black body radiation source, or another illumination source. Additionally, the illumination system 160 may include optics for dispersing or focusing optical radiation for illumination of the target object. The illumination system 160 may be housed inside of the housing 102, may attach to the external surfaces of the housing 102, or may be a separate device or component configured to illuminate the target object for capturing an image by the optical machine vision device 100.

As best seen in FIGS. 2 and 3, the lens assembly 120 includes a number of lens elements disposed in a first lens holder 121a and a second lens holder 121b, specifically the lens assembly 120 includes a first lens group 122, a liquid lens 128, an aperture 130, a second lens group 132, and a third lens group 138. The first lens group 122 includes a first lens 123 disposed inside of the first lens holder 121a, and the first lens group 122 is configured to correct for overall imaging lens distortion and partially balance the field of curvature of optical radiation, such as correcting for spherical aberrations of an image projected by the third lens group 138). The first lens 123 is a plastic aspheric lens with a first aspheric surface 123a and a second aspheric surface 123b and the first lens 123 is configured to receive light from an object of interest or target object. The first lens 123 is made out of a Crown type plastic with an index of refraction of approximately 1.53 and an Abbe value of approximately 56. Additionally, the first lens 123 of the first lens group 122 has an overall positive optical power. In embodiments, the first lens group may include more than a single lens.

In embodiments, the first lens holder 121a may be removably attachable to the second lens holder 121b. For example, as illustrated in FIG. 2, the first lens holder 121a and second lens holder 121b may be threaded and configured for the first lens holder 121a to screw on to the second lens holder 121b. In embodiments, the first lens holder 121a may screw on to the second lens holder 121b to compress a spring to apply force to a spacer, which supplies a force to the liquid lens 128 to prevent the liquid lens from moving within the second lens holder 121*b*. The applied force may assist in preventing the liquid lens 128 from being damaged and helps ensure proper operation of the liquid lens. Additionally, the applied force may assist in ensuring electrical contact with the liquid lens 128.

The liquid lens 128 is positioned along the optical axis A and configured to receive light from the first lens group 122. The liquid lens 128 is disposed inside of the second lens holder 121*b* between the first lens group 122 and the aperture 130. The liquid lens 128 is disposed in close proximity to the aperture 130 to prevent stray light from reaching the imaging sensor 112. In embodiments, the aperture 130 may be a front aperture of the second lens holder 121*b*. In other embodiments the aperture 130 may be physically independent of the second lens holder 121*b*. The liquid lens 128 has a variable optical power from about −5 to +15 diopters allowing the lens assembly 120 to exhibit focal lengths from about 76.2 millimeters to a distance of infinity (i.e., collimation of a beam). In embodiments, electrical circuitry is communicatively coupled to the liquid lens 128 to control the optical power of the liquid lens 128. In embodiments, the electrical circuitry provides a voltage across the liquid lens 128 which changes the optical power of the liquid lens 128 according to the applied voltage value. By varying the optical power of the liquid lens 128 the focal length of the lens assembly 120 can be tuned across a wide range of values. In embodiments, the liquid lens 128 may be positioned between the aperture 130 and the second lens group 132. In embodiments, the liquid lens 128 may be any type of focus tunable lens such as a liquid crystal tunable lens, a nematic liquid crystal tunable lens, an optofluidic tunable lens, another type of electrically tunable lens, or any other variable optical power element. The aperture 130 prevents stray light from entering the sensor 112 therefore reducing optical noise in an image impingent on the imaging sensor 112. The aperture 130 defines the aperture stop of the imaging assembly 120. In embodiments, the aperture is a circular aperture with a diameter of 2.5 millimeters. In other embodiments, the aperture 130 may have a diameter ranging from about 0.7 millimeters to 4 millimeters.

The second lens group 132 includes a first lens 133, a second lens 134, and a third lens 135, and the second lens group 132 is disposed within the second lens holder 121*b* in a position along the optical axis A configured to receive light from the liquid lens 128 and to correct for optical field curvature, distortion, coma, chromatic aberrations, and any Seidal aberrations. In embodiments, the second lens group 132 is a Cooke triplet. The first lens 133 of the second lens group 132 is a plastic aspheric lens with a first aspheric surface 133*a* and a second aspheric surface 133*b* and the first lens 133 is configured to receive light from the liquid lens 128. The first lens 133 is made out of a Crown type plastic with an index of refraction of approximately 1.53 and an Abbe value of approximately 56. Additionally, the first lens 133 of the second lens group 132 has an overall positive optical power. The first lens 133 of the second lens group 132 is configured to correct for pupil aberrations of the optical field due to the aperture. The second lens 134 of the second lens group 132 is a plastic aspheric lens with a first aspheric surface 134*a* and a second aspheric surface 134*b* and the second lens 134 is configured to receive light from the first lens 133 of the second lens group 132. The second lens 134 is made out of a Flint type plastic with an index of refraction of approximately 1.65 and an Abbe value of approximately 22. Additionally, the second lens 124 of the second lens group 132 has an overall negative optical power. The third lens 135 of the second lens group 132 is a glass lens made out of a Crown type material with an index of refraction of about 1.76 and an Abbe value of about 52. The third lens 135 has an overall positive optical power. The third lens 135 has a first surface 135*a* that is substantially flat, and a second surface 135*b* that is spherical. As a glass lens, the third lens 135 provides thermal stability to the lens assembly 120 over a range of temperatures from −10° C. to 70° C. Additionally, the glass lens provides the majority of the optical power for the lens assembly 120. Due to the proximity of the second lens group 132 to the aperture 130, the second lens group 132 is configured to correct primarily for spherical aberrations. In embodiments, the second lens group may be configured to correct for at least one of optical field curvature, astigmatism, coma, chromatic aberrations, and any other Seidal aberrations.

The third lens group 138 includes a first lens 139, and a second lens 140, and the third lens group 138 is disposed inside of the second lens holder 121*b* in a position along the optical axis A configured to receive light from the second lens group 132. Along with the first lens group 122, the third lens group 138 is configured to correct for optical field curvature. The first lens 139 of the third lens group 138 is a plastic aspheric lens with a first aspheric surface 139*a* and a second aspheric surface 139*b* and the first lens 139 is configured to receive light from the second lens group 132. The first lens 139 is made out of a Flint type plastic with an index of refraction of approximately 1.65 and an Abbe value of approximately 24. Additionally, the first lens 139 of the second lens group 138 has an overall positive optical power. In embodiments, the first lens 139 of the third lens group 138 may be made out of a Flint type plastic material. The second lens 140 of the third lens group 138 is a plastic aspheric lens with a first aspheric surface 140*a* and a second aspheric surface 140*b* and the second lens 140 is configured to receive light from the first lens 139 of the second lens group 138. The second lens 140 is made out of a Flint type plastic with an index of refraction of approximately 1.64 and an Abbe value of approximately 24. Additionally, the second lens 140 of the third lens group 138 has an overall negative optical power.

The lens assembly 120 defines an optical axis that is approximately collinear with the central imaging axis of the image sensor 112. The lens assembly 120 and the image sensor 112 are aligned such that light received from the field of view passes through the aperture 114, the first surface 123*a* and the second surface 123*b* of the first lens 123 of the first lens group 122, the first surface 124*a* and the second surface 124*b* of the second lens 124 of the first lens group 122, the first surface 128*a* and the second surface 128*b* of the liquid lens 128, the first surface 133*a* and the second surface 133*b* of the first lens 133 of the second lens group 132, the first surface 134*a* and the second surface 134*b* of the second lens 134 of the second lens group 132, the first surface 135*a* and the second surface 135*b* of the third lens of the second lens group 132, the first surface 139*a* and the second surface 139*b* of the first lens 139 of the third lens group 138, the first surface 140*a* and the second surface 140*b* of the second lens 140 of the third lens group 138, and ultimately impinges onto the image sensor 112.

The lens assembly 120 may be modified as needed in various applications. For example, in embodiments, the first lens group 122 may include two lenses, three lenses, or another number of lenses configured to correct for optical field curvature and distortions. Additionally, the third lens group 138 could consist of a single lens, or three lenses. In embodiments, the first and second lens holders 212*a* and 121*b* may be physically coupled, physically independent, or may be a single lens holder. Additionally, the first and second lens holders 121a and 121b may be made of a plastic material and the liquid lens may be held inside of the first lens holder 121a by a spring and a retaining ring. Additionally, the lenses of the various lens groups may be held inside of the first and second lens holders 121a and 121b using set screws, retaining rings, or other mechanical elements for positioning the lenses inside of the first and second lens holders 121a and 121b. In embodiments, a wrap-around flexible cable is used to provide electrical power to the liquid lens and to control the focal distance of the imaging assembly 120.

The lens assembly 120 has a flange focal distance 150 that is the distance from the second surface 140b of the second lens 140 of the third lens group 138 to the image sensor 112. In embodiments, the flange focal distance 150 may be considered to be the distance from the last optical element, or mechanical element, to the imaging plane at the sensor 112. Imaging systems that employ small area sensors, such as the sensor 112, require active alignment of the sensor 112 to achieve high levels of image resolution for processing of images. Active alignment of the imaging sensor 112 requires that the back flange focal length 150 be greater than tens of microns to ensure that the image sensor 112 does not physically contact the second surface 140b of the second lens 140 of the third lens group 138, potentially causing damage, or scratching the second surface 140b. Additionally, an increased flange focal length 150 allows for additional elements to be added between the sensor 112 and the second surface 140b of the second lens 140 of the third lens group 138, such as a cover glass, chromatic filter, dispersion correction element, diffuser, or other optical element. Further, any blurring or distortion of an image due to dust, dirt, or minor incongruities of the lenses may be mitigated by back focal distances greater than tens of millimeters due to a blurring effect of the distortions over larger back focal lengths 150. In embodiments described herein, the flange focal length 150 may be 10 millimeters, 20 millimeter, 30 millimeters, or between 10 and 30 millimeters. In embodiments, the flange focal length 150 is equal to or greater than 2.5 millimeters.

In embodiments described herein, the lens assembly has a variable focal length of approximately 76.2 millimeters, to a distance of infinity. In embodiments, the lens assembly described herein has an f-number equal to or less than 5. The lens assembly 120 has a reduced number of elements compared to other autofocusing imaging systems for machine vision (i.e., 6 elements instead of 11 or 12 elements) and delivers high resolution required for imaging of target objects on three micron imaging sensors. In embodiments, the distance from the first lens group 122 to the imaging sensor 112 is approximately two to three times less than other optical assemblies for machine vision applications. For example, in embodiments the flange focal length 150 may be less than 20 millimeters, whereas a typical C-mount for a machine vision system is 50 millimeters or greater.

In embodiments, the imaging sensor 112 may be a charge coupled device, or another solid-state imaging device. The imaging sensor 112 may be a one megapixel sensor with pixels of approximately three microns in size. In embodiments, the imaging sensor includes 3 millimeter pixels, having a total of about 2 megapixels, resulting in an overall imaging sensor width and length of 3 microns in each dimension. In embodiments, the lens assembly is configured to capture images with a modulation transfer function of 40% at 160 line pairs per millimeter.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An optical assembly for wide angle auto-focused imaging of an object of interest, the optical assembly comprising:
   a first lens group disposed along an optical axis configured to receive light from the object of interest and configured to correct for spherical aberrations of an image projected after a third lens group onto an imaging sensor;
   a liquid lens disposed along the optical axis configured to receive the light from the first lens group and further configured to have a variable optical power from −5 diopters to +15 diopters;
   an aperture stop disposed along the optical axis between the liquid lens and the second lens group;
   a second lens group disposed along the optical axis configured to receive the light from the liquid lens and further configured to correct for optical aberrations;
   the third lens group being disposed along the optical axis configured to receive the light from the second lens group and further configured to correct for optical field curvature and distortion of the image projected after the third lens group onto the imaging sensor; and
   the imaging sensor being disposed along the optical axis at a back focal distance of the third lens group, and configured to receive the image from the third lens group and to generate an electrical signal indicative of the received image;
   wherein the first lens group comprises a plastic aspheric lens disposed along the optical axis, the plastic aspheric lens having a first aspheric surface along the optical axis and a second aspheric surface opposite the first aspheric surface disposed along the optical axis, and wherein the first plastic aspheric lens is formed of a plastic having an Abbe value of approximately 56 and a positive optical power.

2. The optical assembly of claim 1, wherein the imaging sensor is a solid-state imager.

3. The optical assembly of claim 1, wherein the back focal distance is from 4 to 20 millimeters, inclusively.

4. The optical assembly of claim 1, wherein the second lens group configured to correct for optical aberrations is configured to correct for at least one of field curvature, astigmatism, coma, spherical aberrations, or chromatic aberrations.

5. The optical assembly of claim 1, wherein the optical assembly has a flange focal length of equal or greater than 2.5 millimeters, and an f-number of greater than 4 and less than 5.

6. The optical assembly of claim 1, wherein the liquid lens has an aperture of between 0.7 to 4 millimeters.

7. The optical assembly of claim 1, wherein the first lens group comprises two aspheric surfaces.

8. The optical assembly of claim 1, wherein the optical assembly comprises three aspheric plastic lenses.

9. The optical assembly of claim 1, wherein the third lens group comprises a single aspheric plastic lens.

10. The optical assembly of claim 1, further comprising a lens holder with a front aperture, the lens holder configured to hold the liquid lens, the second lens group, and the third lens group in position along the optical axis to provide the image to the imaging sensor.

11. The optical assembly of claim 1, further comprising an illumination system configured to illuminate a target for imaging of the target by the imaging sensor.

12. An optical assembly for wide angle auto-focused imaging of an object of interest, the optical assembly comprising:
   a first lens group disposed along an optical axis configured to receive light from the object of interest and configured to correct for spherical aberrations of an image projected after a third lens group onto an imaging sensor;
   a liquid lens disposed along the optical axis configured to receive the light from the first lens group and further configured to have a variable optical power from −5 diopters to +15 diopters;
   an aperture stop disposed along the optical axis between the liquid lens and the second lens group;
   a second lens group disposed along the optical axis configured to receive the light from the liquid lens and further configured to correct for optical aberrations;
   the third lens group being disposed along the optical axis configured to receive the light from the second lens group and further configured to correct for optical field curvature and distortion of the image projected after the third lens group onto the imaging sensor; and
   the imaging sensor being disposed along the optical axis at a back focal distance of the third lens group, and configured to receive the image from the third lens group and to generate an electrical signal indicative of the received image;
   wherein the second lens group comprises a first plastic aspheric lens, a second plastic aspheric lens, and a third glass lens, the first plastic aspheric lens is disposed along the optical axis between the second plastic aspheric lens and the aperture, and the third glass lens is disposed between the second plastic aspheric lens and the third lens group.

13. The optical assembly of claim 12, wherein the first plastic aspheric lens of the second lens group has a first aspheric surface along the optical axis and a second aspheric surface opposite the first aspheric surface disposed along the optical axis, and wherein the first plastic aspheric lens is formed of a plastic having an Abbe value of approximately 56 and a positive optical power, the second plastic substantially aspheric lens of the second lens group has a first aspheric surface along the optical axis and a second aspheric surface along the optical axis, and wherein the second plastic aspheric lens is formed of a material having an Abbe value of approximately 22 and a negative optical power, and the third glass lens has a first substantially flat surface along the optical axis and a second spherical surface disposed along the optical axis, and the third glass lens is formed of a glass having an Abbe value of approximately 56 and a positive optical power.

14. An optical assembly for wide angle auto-focused imaging of an object of interest, the optical assembly comprising:
a first lens group disposed along an optical axis configured to receive light from the object of interest and configured to correct for spherical aberrations of an image projected after a third lens group onto an imaging sensor;
a liquid lens disposed along the optical axis configured to receive the light from the first lens group and further configured to have a variable optical power from −5 diopters to +15 diopters;
an aperture stop disposed along the optical axis between the liquid lens and the second lens group;
a second lens group disposed along the optical axis configured to receive the light from the liquid lens and further configured to correct for optical aberrations;
the third lens group being disposed along the optical axis configured to receive the light from the second lens group and further configured to correct for optical field curvature and distortion of the image projected after the third lens group onto the imaging sensor; and
the imaging sensor being disposed along the optical axis at a back focal distance of the third lens group, and configured to receive the image from the third lens group and to generate an electrical signal indicative of the received image;
wherein the third lens group comprises a first plastic aspheric lens and a second plastic aspheric lens, the first plastic aspheric lens disposed along the optical axis between the second lens group and the second plastic aspheric lens, and the second plastic aspheric lens being disposed along the optical axis between the first plastic aspheric lens and the imaging sensor.

15. The optical assembly of claim 14, wherein the first plastic aspheric lens of the third lens group has a first aspheric surface along the optical axis and a second aspheric surface opposite the first aspheric surface disposed along the optical axis, and wherein the first plastic aspheric lens is formed of a plastic having an Abbe value of approximately 22 and a positive optical power, and the second plastic aspheric lens of the first lens group has a first aspheric surface along the optical axis second aspheric surface along the optical axis, and wherein the second plastic aspheric lens is formed of a material having an Abbe value of approximately 22 and a negative optical power.

* * * * *